United States Patent
Kämper et al.

(10) Patent No.: US 6,523,893 B2
(45) Date of Patent: Feb. 25, 2003

(54) VEHICLE SEAT FRAME

(75) Inventors: Ralf Kämper, Heessen (DE); Norbert Kielsmeier, Obernkirchen (DE)

(73) Assignee: Faurecia Autositze GmbH & Co., KG (DE)

( * ) Notice: Subject to any disclaimer, the term of this patent is extended or adjusted under 35 U.S.C. 154(b) by 0 days.

(21) Appl. No.: 09/846,594

(22) Filed: May 1, 2001

(65) Prior Publication Data

US 2001/0052724 A1 Dec. 20, 2001

(30) Foreign Application Priority Data

Jun. 15, 2000 (DE) .......................... 100 29 551

(51) Int. Cl.[7] ................................. B60N 2/42
(52) U.S. Cl. ................................. 297/216.13
(58) Field of Search ....................... 297/216.13, 216.14, 297/452.2, 452.18, 452.4

(56) References Cited

U.S. PATENT DOCUMENTS 3,544,164 A * 12/1970 Ohta
4,192,545 A *  3/1980 Higuchi et al.
5,681,081 A * 10/1997 Lindner et al.

* cited by examiner

*Primary Examiner*—Milton Nelson, Jr.
(74) *Attorney, Agent, or Firm*—Bourque & Associates, P.A.

(57) ABSTRACT

A crosspiece for the frame of a vehicle seat that includes a supporting surface for the occupant. A crosspiece is formed as an element that shortens by a preset amount along its longitudinal dimension when a load is imposed up to a threshold value. The crosspiece includes an intentional bending point that bends perpendicular to the longitudinal direction when the threshold value is exceeded so that the crosspiece does not move in the direction of the supporting surface.

11 Claims, 6 Drawing Sheets

VEHICLE SEAT FRAME

TECHNICAL FIELD

The present invention relates to a frame for a vehicle seat and more particularly, to a seat support crosspiece that is formed as an element that shortens by a preset amount along its longitudinal dimension when a load is imposed up to a threshold value, and that further includes an intentional bending point that bends out under load perpendicular to the longitudinal direction exceeding a threshold value so that the crosspiece does not move in the direction of the supporting surface.

BACKGROUND INFORMATION

A frame of a known type (JP 1 11 05 602 A) is stiffened by a one-piece crosspiece. The crosspiece is supposed to reduce deformation of the frame during a lateral vehicle collision. If a threshold load is exceeded, the crosspiece becomes deformed in an uncontrolled manner at an uncontrolled point along with the rest of the frame. Such uncontrolled deformation creates a hazard both for the seat occupant and for other vehicle passengers.

It is further known to provide a vehicle seat with a crosspiece of variable length (EP 0 983 910 A1) that is designed to join with neighboring supporting elements connected to the vehicle body in case of a crash. This design is intended to stiffen the passenger compartment during a lateral impact by means of the cross support.

Based on the state of the art mentioned initially, it is the task of the invention to configure a vehicle seat frame so that it deforms in a controlled manner that is not hazardous to the occupant or other vehicle passengers during a lateral impact.

SUMMARY OF THE INVENTION

The present invention features a cross-brace in a vehicle seat that will deform and bend in a predetermined way during an impact situation. Deformation energy from the impact is absorbed during a first phase by means of the shortening to the crosspiece resulting at the inception of frame deformation. During this first phase, the crosspiece is merely shortened. After completion of the first phase and upon transgression of a prescribed shortening path, the crosspiece bends in a controlled manner, namely in such a manner that the danger of injury to vehicle passengers is minimized.

Formation of the crosspiece from two telescoping friction-fit partially overlapping tubes is particularly advantageous. Surrounding corrugations are pressed into the overlapping areas of the two tubes after they are telescoped.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
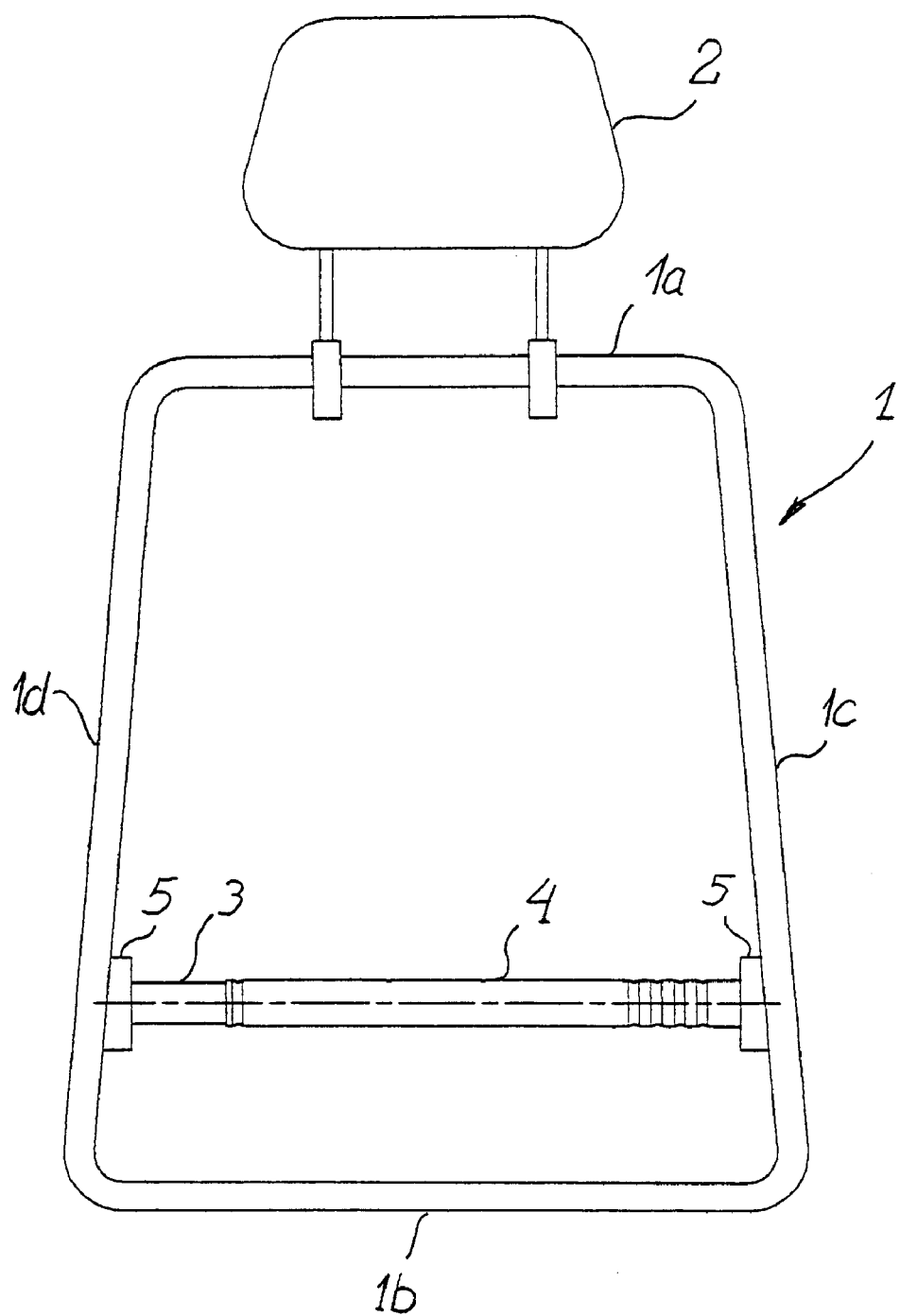
FIG. 1 is the frame of a seat back in its initial state with the crosspiece of the present invention in place.

FIG. 1 shows a frame 1 of a seat back onto which a headrest 2 is secured in a manner well known and not shown in detail. The frame 1 includes an upper transverse spar 1a and a lower transverse spar 1b that are connected with each other by means of two lateral spars 1c and 1d. A crosspiece formed of two tubes 3 and 4 extends between the lateral spars 1c and 1d. The crosspiece is firmly connected with the lateral spars 1c and 1d by means of flanges 5. The crosspiece is arranged horizontally and parallel to the transverse spars 1a and 1b. The crosspiece itself may also be formed by a transverse spar of the frame 1.

The tube 3 has an outer diameter corresponding to that of the inner diameter of the tube 4, and is surrounded for part of its length by tube 4. The tube 3 has one end secured to the lateral spar 1d. The tube 4 is firmly connected to the lateral spar 1c on the opposite side.

Figure 2:
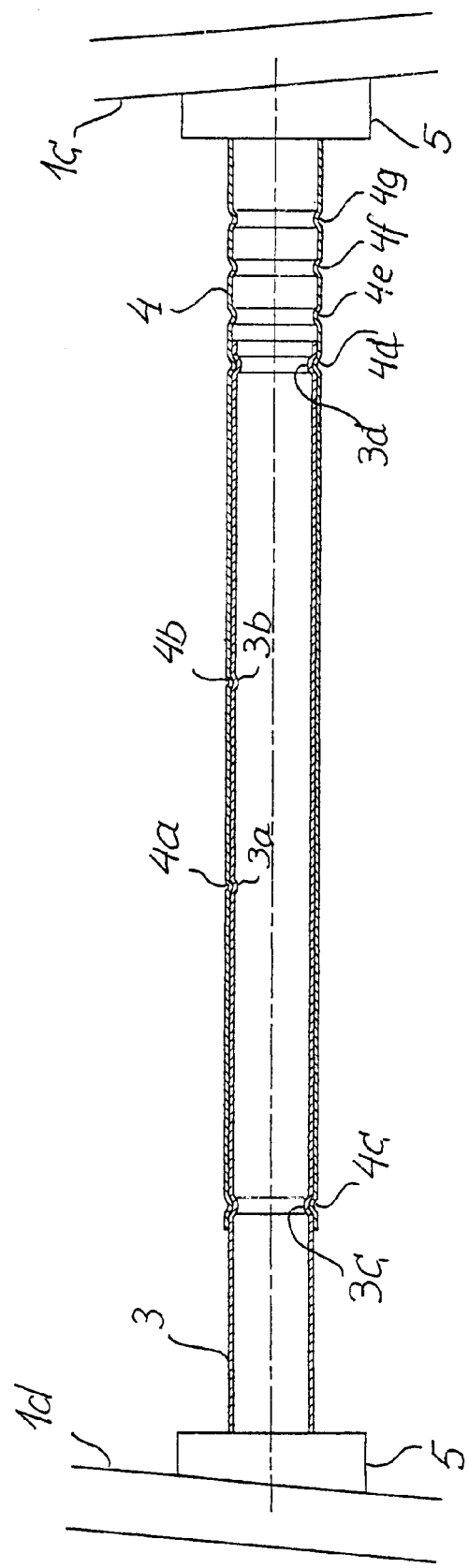
FIG. 2 is an enlarged longitudinal cross-section through the crosspiece of FIG. 1.

The ends of both tubes 3 and 4, FIG. 2, are at an equal distance from their respective lateral spars 1c and 1d to which they are not connected. On its upper side, tube 4 includes two notches 4a and 4b that are separated. The tube 3 also possesses notches 3a and 3b that are in a common vertical plane with notches 4a or 4b in its initial position. The separation of the notches 3a or 4a from notches 3b or 4b is the same as the distance between the lateral spars 1c or 1d and the free ends of the tube 3 or 4.

A surrounding notch or corrugation 4c is provided at the end of the tube 4 that fits into a notch or corrugation 3c in tube 3. Correspondingly, the tube 3 has a surrounding notch or corrugation 3d near its end into which a notch or corrugation 4d fits. The tube 4 includes further surrounding notches or corrugations 4e, 4f, and 4g parallel to each other between the corrugation 4d and the flange 5. The corrugations 4e, 4f, and 4g are not engaged with the tube 3 in the initial position.

Figure 3:
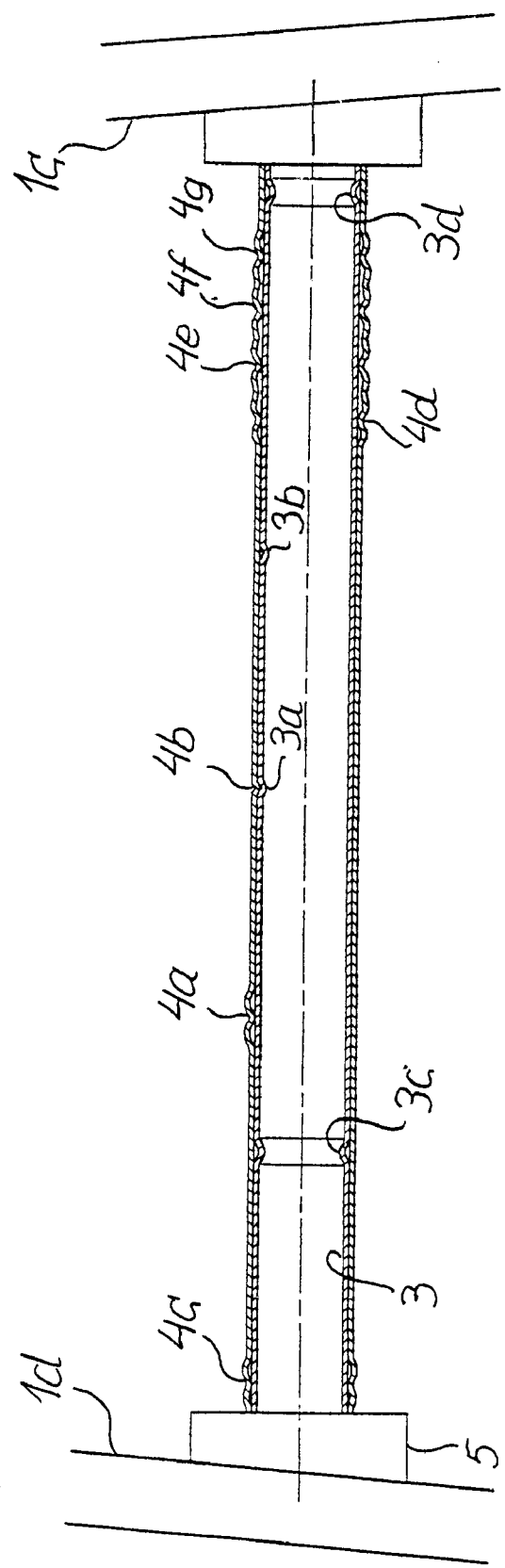
FIG. 3 is a longitudinal cross-section through the crosspiece of FIG. 1 partially deformed as the result of an impact as a result of a crash.
Figure 4:
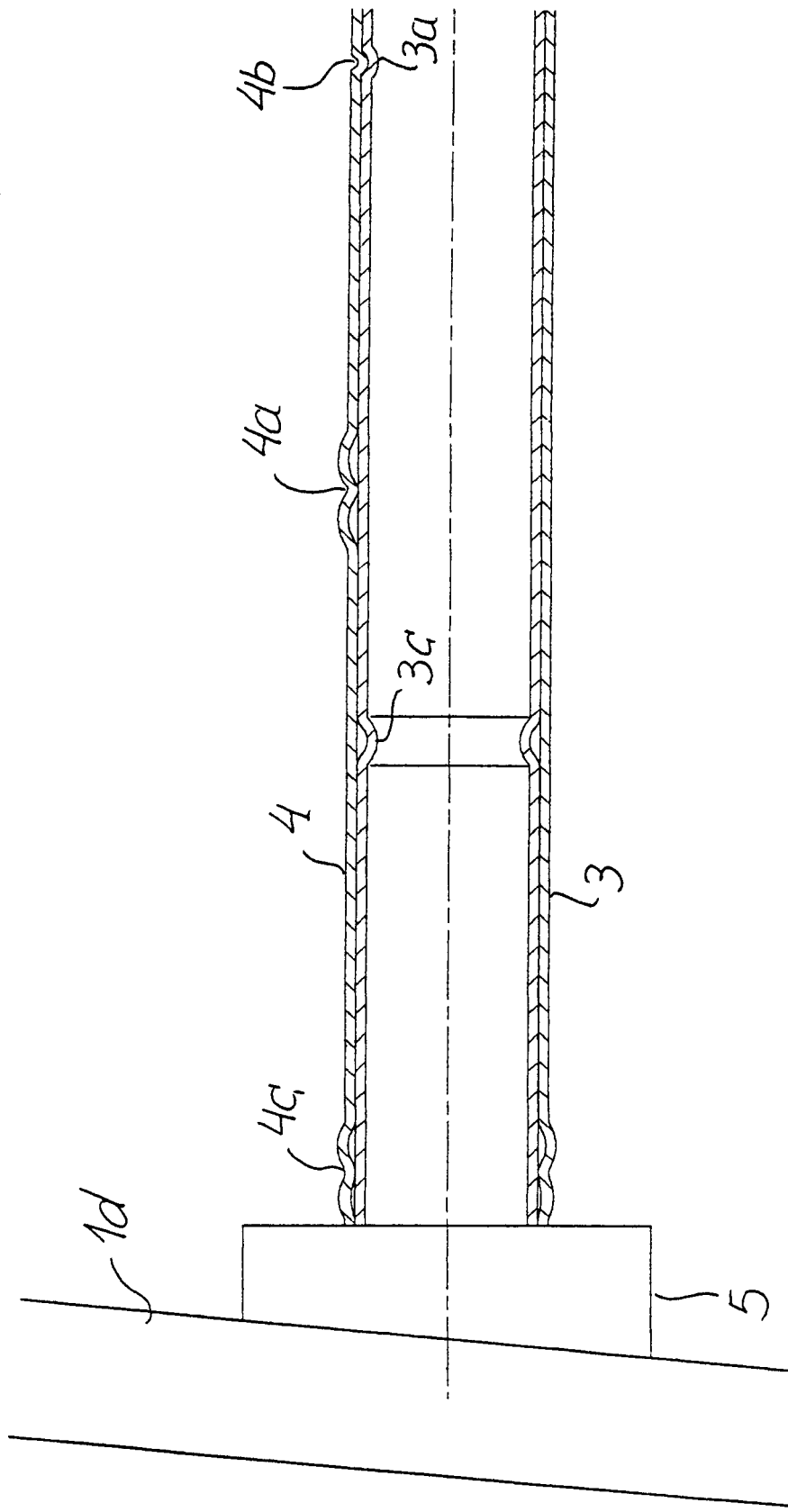
FIG. 4 is an enlarged sectional view of the left side of the crosspiece of FIG. 3.
Figure 5:
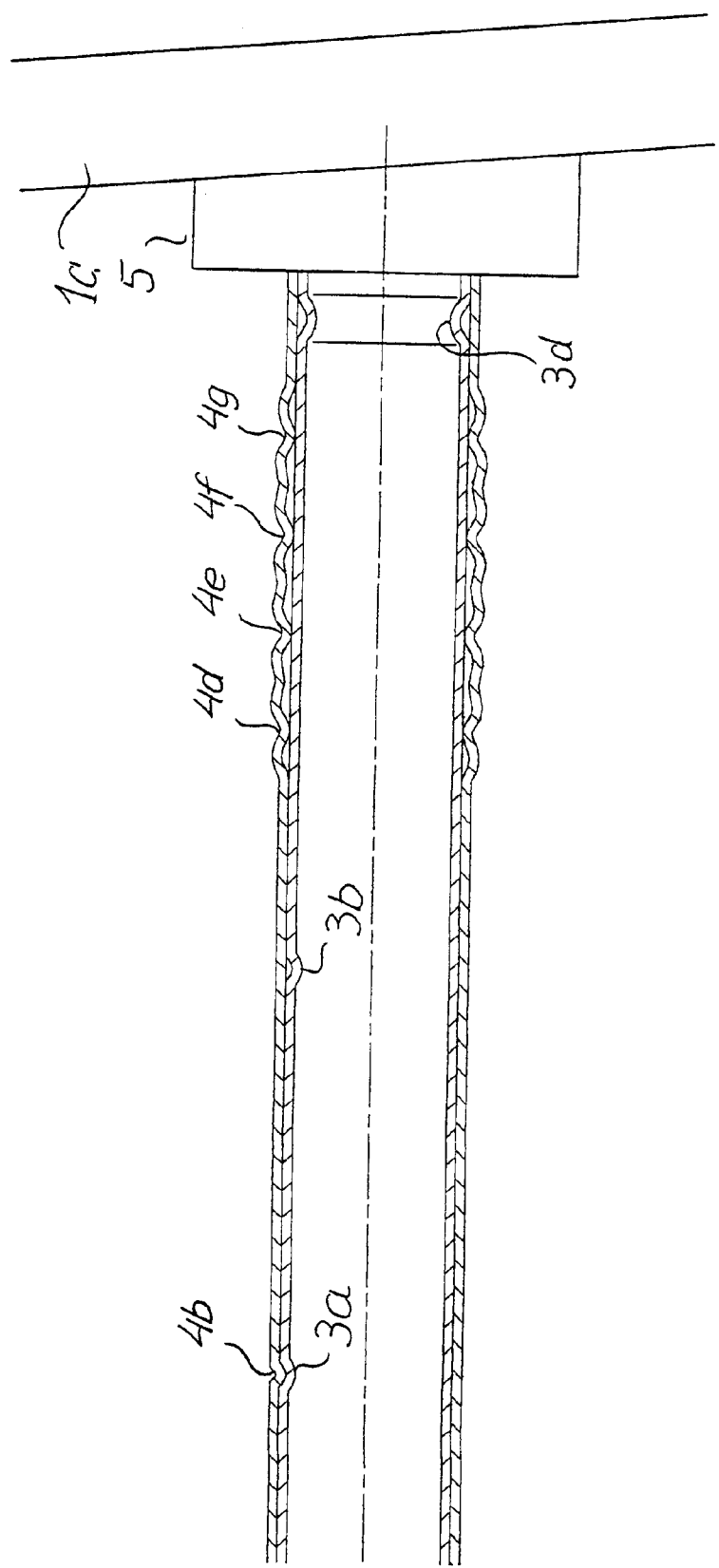
FIG. 5 is an enlarged sectional view of the right side of the crosspiece of FIG. 3.

During a lateral crash in which seat back frame 1 is deformed so that the lateral spars 1c and 1d are pressed toward each other, the tube 4 is forced further over tube 3 (as shown in FIG. 3). For this, the notches 4c and 4b and the surrounding corrugations 4c and 4d must first be expanded. After further displacement of the tubes 3 and 4 with respect to each other, the corrugations 4e, 4f, and 4g are sequentially also expanded. By means of the expansion of notches 4a and 4b and of the surrounding corrugations 4c through 4g, kinetic energy is transformed into harmless deformation energy. Correspondingly, the impact energy is damped by the friction between the tubes 3 and 4 by means of the friction between the corrugations 4c through 4g and the outer surface of the tube 3.

Figure 6:
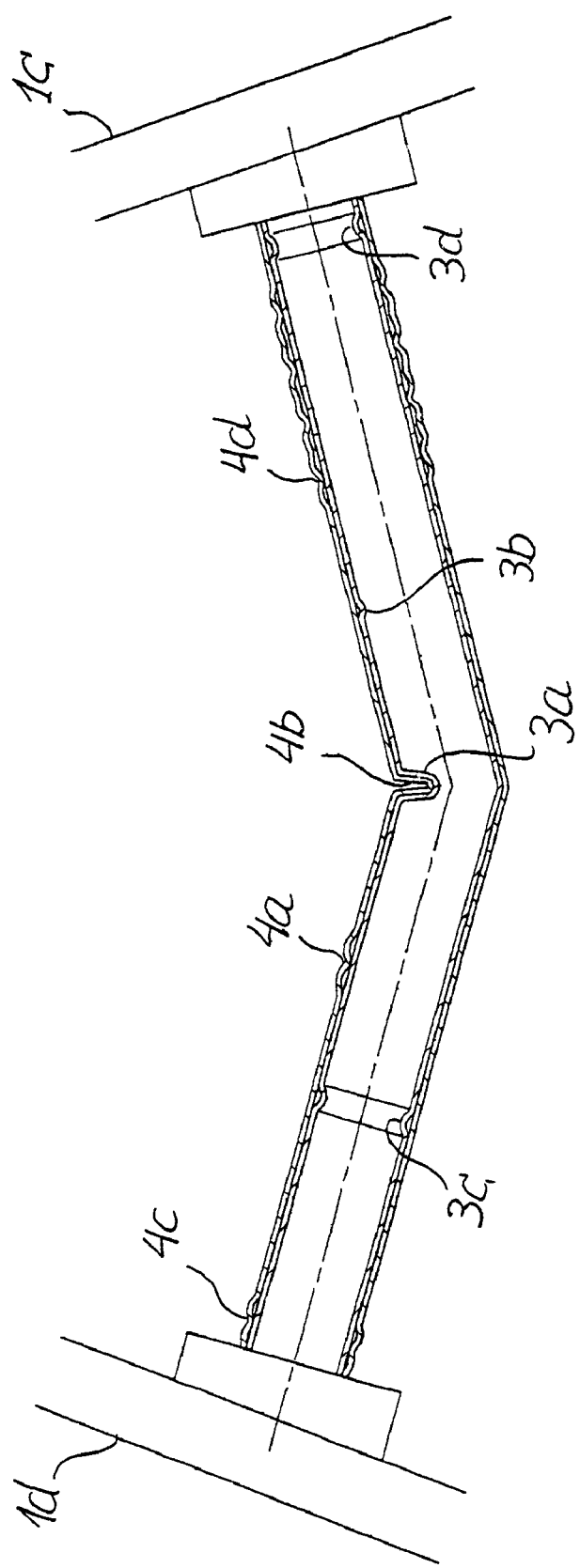
FIG. 6 is a longitudinal cross-section through the completely deformed crosspiece of FIG. 1.

If the ends of the tubes 3 and 4 not secured to the frame 1 rest on the flanges 5, the notch 4b is located even with the notch 3a. The bending resistance of the tube connection is thereby weaker at this point than that of the rest of the tube. The tubes 3 and 4 will thus bend out at the notched location 3a/4b when a threshold value is exceeded, as FIG. 6 shows. This bending occurs in the direction determined by the notches 3a and 4b since the notches pass over only a portion of the overlap between tubes 3 and 4, thus the bending resistance is weakened only in one direction.

Modifications and substitutions by one of ordinary skill in the art are considered to be within the scope of the present invention which is not to be limited except by the claims which follow.

What is claimed is:

1. A crosspiece for a vehicle seat having a vehicle seat frame and a supporting surface for an occupant wherein said crosspiece is formed as an element that shortens by a preset amount along a longitudinal axis when a load is imposed up to a threshold value, wherein said crosspiece further includes an intentional bending point that bends out perpendicular to said longitudinal axis under load exceeding said threshold value so that said crosspiece does not move in a direction of said supporting surface.

2. The crosspiece for a vehicle seat as recited in claim 1, wherein said crosspiece includes two overlapping tubes that each contain at least one matching and overlapping notch, said at least one matching and overlapping notch forming said intentional bending point.

3. The crosspiece for a vehicle seat as recited in claim 2, wherein said matching and overlapping notches that determine said intentional bending point are arranged on an upper side of said crosspiece allowing bending of said crosspiece in a downward direction.

4. The crosspiece for a vehicle seat as recited in claim 2, wherein each of said two overlapping tubes forming said crosspiece each contain a plurality of notches.

5. The crosspiece for a vehicle seat as recited in claim 4, wherein a first group of said plurality of notches in one of said two overlapping tubes forming said crosspiece overlap and match with a second group of said plurality of notches in the other of said two overlapping tubes forming said crosspiece.

6. The crosspiece for a vehicle seat as recited in claim 5, wherein said plurality of overlapping and matching notches fit into one another in an initial, unloaded position of said crosspiece.

7. The crosspiece for a vehicle seat as recited in claim 4, wherein several of said plurality of notches in at least one of said overlapping tubes forming said crosspiece do not match with another notch in an initial unloaded condition, and wherein said several of said plurality of notches are provided along said longitudinal direction of said at least one of said overlapping tubes of said crosspiece.

8. The crosspiece for a vehicle seat as recited in claim 2, wherein a first tube of said crosspiece is adapted to be connected to a lateral spar of said vehicle seat frame, and a second tube is adapted to be connected to an opposing lateral spar of said vehicle seat frame.

9. The crosspiece for a vehicle seat as recited in claim 1, wherein said crosspiece is an additional element of said vehicle seat frame.

10. The crosspiece for a vehicle seat as recited in claim 1, wherein said crosspiece is an integral element of said vehicle seat frame.

11. A crosspiece for a vehicle seat having a supporting surface for a seat occupant wherein the crosspiece is formed as an element that shortens by a preset amount along a longitudinal axis of said crosspiece when a load is imposed up to a threshold value, wherein said crosspiece further includes an intentional bending point that bends outward perpendicular to the longitudinal axis under load exceeding said threshold value so that the crosspiece does not move in a direction of the supporting surface, said crosspiece including two overlapping tubes that each contain at least one matching and overlapping notch, said at least one matching and overlapping notch forming said intentional bending point.

* * * * *